Jan. 29, 1957    F. S. KING ET AL    2,779,380
TUBELESS TIRE
Filed May 28, 1954    3 Sheets-Sheet 1
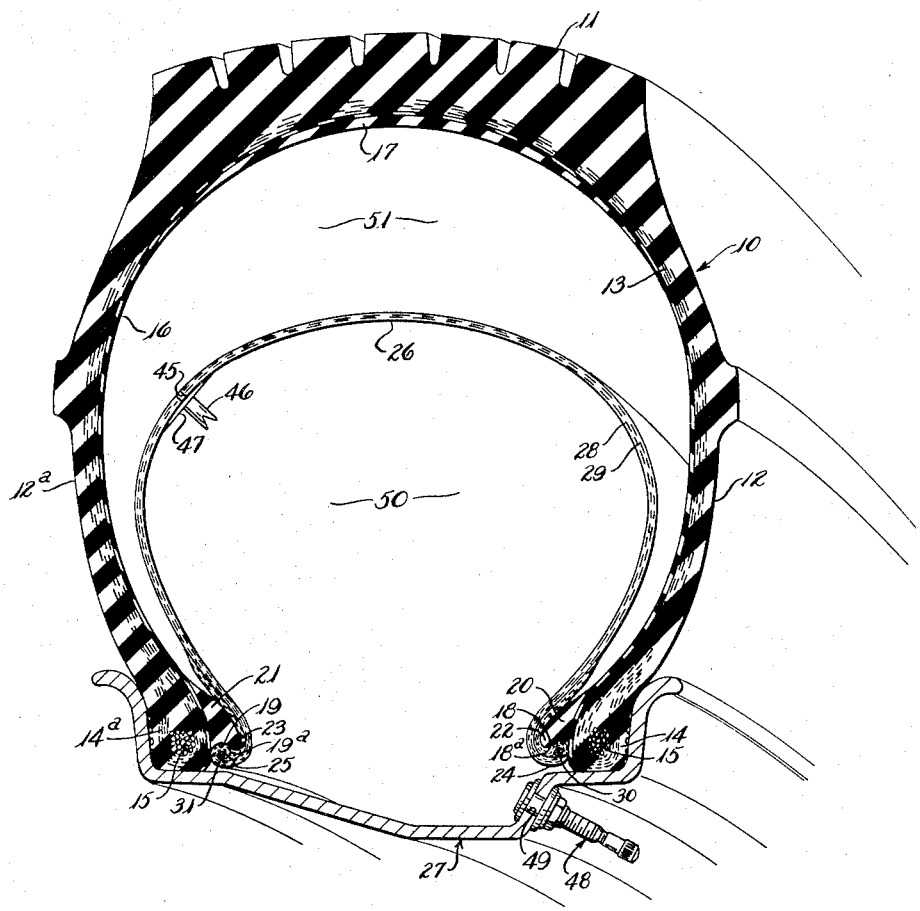
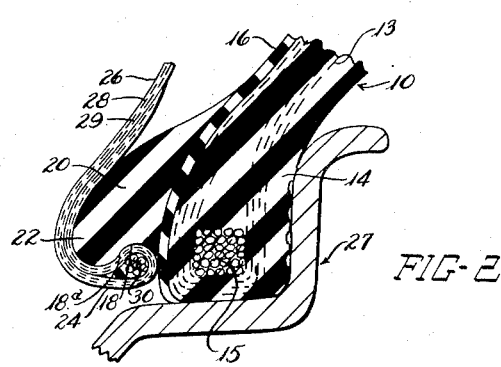
INVENTORS
FRANK S. KING
BY WILLIAM S. COBEN
W. A. Fraser
ATY.-

INVENTORS
FRANK S. KING
BY WILLIAM S. COBEN

W. A. Fraser
ATTY-

United States Patent Office 2,779,380
Patented Jan. 29, 1957

2,779,380

TUBELESS TIRE

Frank S. King and William S. Coben, Akron, Ohio, assignors to The Firestone Tire & Rubber Company, Akron, Ohio, a corporation of Ohio Application May 28, 1954, Serial No. 433,015

8 Claims. (Cl. 152—341)

The invention relates generally to pneumatic tires of the tubeless type, and more particularly to tires in combination with diaphragms which are used with such tires for preventing the complete collapse of the tires in the event of a blowout or rupture of the tire carcasses.

One known type of such diaphragms has the general shape of an open-beaded tire with inextensible bead portions for seating on the bead seats of the rim inside of and abutting against the bead portions of the carcass, so as to form a substantially air tight seal between the diaphragm and the rim thereby insuring that the diaphragm will remain inflated in the event the carcass is ruptured.

Before the present invention in mounting these tubeless tires and diaphragms on the tire rim, difficulty was experienced in positioning the bead portions of the diaphragm on the bead seats of the rim and in keeping them properly positioned as the tire was inflated. As will be noted from the following specification and the drawings, the diaphragm is provided with a flutter valve which allows the initial inflationary air to pass through the diaphragm into an outer chamber as rapidly as it flows into an inner chamber and the pressure is thus the same inside and outside of the diaphragm. Accordingly, if the diaphragm beads are not in proper seating position at the beginning of inflating the tire, the internal air pressure may not seat them properly and the diaphragm will be out of balance and may not hold air and fail to function as a safety member in the event of a tire blowout.

The objects of the present invention are attained by providing a tire adapted for use upon a standard tire rim in which recessed diaphragm seats are provided on the inner wall of the tire adjacent the beads thereof, said recesses opening radialy inwardly and being adapted to receive and removably retain inextensible marginal edges of a safety diaphragm mounted in the tire.

An object of the invention is to provide a tubeless tire with a diaphragm of smaller cross-section than that of the tire mounted therein, said diaphragm being so constructed and disposed relative to the tire as to function as a safety member, which becomes operative, to carry the load on the tire, in the event of a blowout of the tire or a sudden loss of the tire's inflation pressure.

Another object of the invention is to provide a diaphragm for use with an open-beaded tire, said diaphragm itself being open-beaded in shape and being composed principally of one or more plies of rubberized fabric attached at their edges to annular inextensible members, said diaphragm being adapted to be removably interlocked with a radial inside surface of the bead portions of the tire.

A further object of the invention is to provide a diaphragm of the type referred to above which may be easily mounted within a tire and which will automatically center itself relative to the tire and remain anchored in such position when the tire is run in service.

Yet another object of the invention is to provide a tire having a diaphragm mounted therein adapted to function as an auxiliary load-carrying means, said tire having a coating substantially impervious to air so disposed as to prevent loss of inflation pressure so long as the coating is not ruptured and to provide an additional coating or layer of material on the inside of the crown of the tire adapted to seal punctures.

In the drawings:

Fig. 1 is a fragmentary perspective view, partly in section of one embodiment of the invention showing the relative positions of the tire, diaphragm and rim as they appear in service;

Fig. 2 is a partial view of Fig. 1 drawn to larger scale to more clearly show the tire lining and the sealing ribs on the side of the tire beads;

Figure 3:
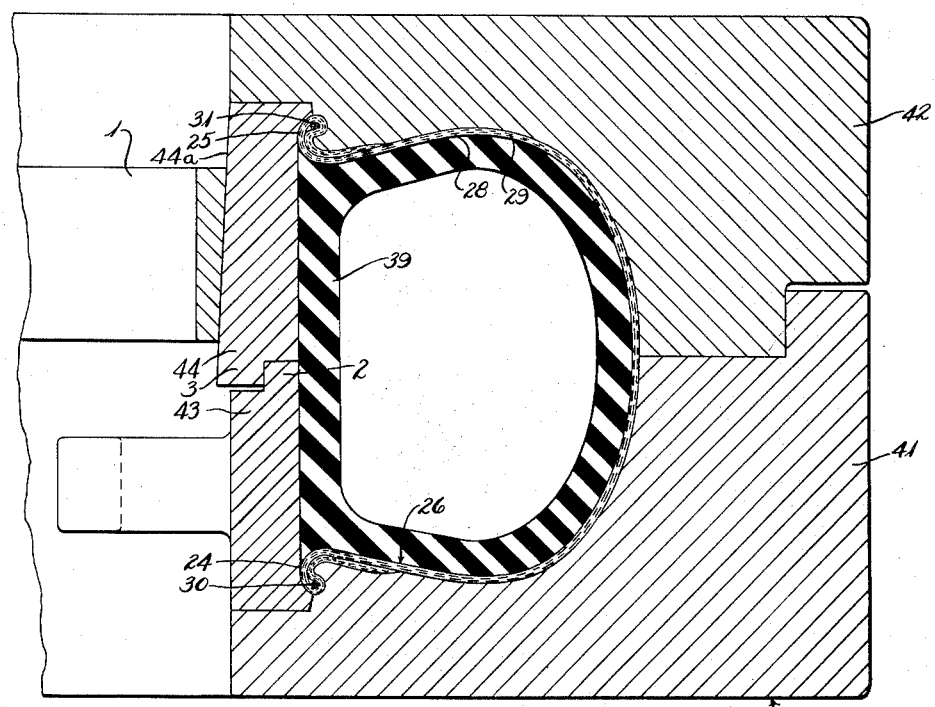
Fig. 3 is a sectional view showing the diaphragm of Fig. 1 mounted on a curing bag and laid in a mold, the assembly being shown as it will appear with the bag inflated during molding and vulcanization of the diaphragm.
Figure 4:
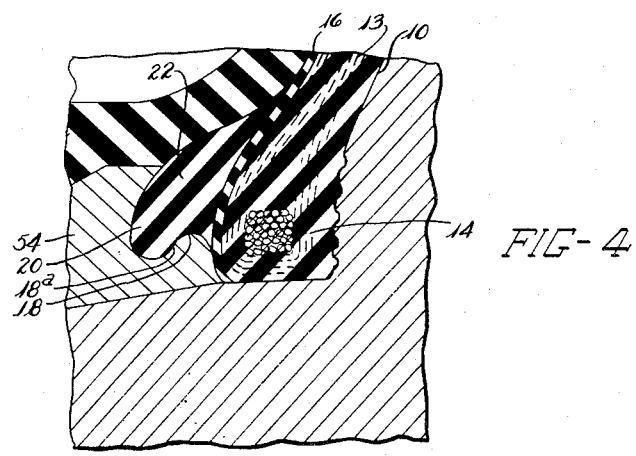
Fig. 4 is a fragmentary sectional view of the tire showing the relative position of a curing bag, a bull ring and a bead portion of said tire in the mold in which the tire is vulcanized.

Referring to Fig. 1 of the drawings, there is shown a tire 10 comprising the usual tread portion 11, sidewalls 12 and 12a, tire plies 13 and bead portions 14 and 14a. The beads are of the straight side type in which are located inextensible wires 15 by which the tire is held on its seat on the rim. The tire 10 has an air impervious lining 16 extending from toe to toe of the tire beads. This lining is preferably composed of butyl of approximately .010" thickness. A puncture sealing layer 17 of any suitable material is disposed at the crown of the tire. For passenger tires, the layer 17 has thin edges and is preferably approximately 5/16" thick at its thickest portion and of a width to underlie the tread portion of the tire.

Diaphragm seats 18 and 19 are molded in ledges 20 and 21, said ledges being integral parts of tire 10 disposed at each bead portion thereof. The diaphragm ledges are preferably composed of flexible rubber and in one embodiment of the invention, the ledges are reinforced with endless rings of inextensible wire as will be explained later hereinafter. The lateral inner portions of ledges 20 and 21 terminate in rounded continuous circumferentially extending edges 22 and 23; the surfaces of said edges 22 and 23 merge into radially inwardly facing grooves 18a and 19a which form said diaphragm seats 18 and 19, respectively, said grooves being adapted to receive and seat inextensible edge portions 24 and 25 of the diaphragm 26, as will be seen by reference to Fig. 1. It will be noted by further reference to Fig. 1 that the grooves 18a and 19a are disposed laterally inwardly and radially outwardly of the tire beads a sufficient distance to provide clearance between the radially inward edge of diaphragm 26 and a rim 27 on which tire 10 is mounted.

Diaphragm 26 comprises two layers or plies of rubberized cord fabric 28 and 29, which plies are turned about inextensible wire members 30 and 31 in similar fashion to tire plies about the inextensible bead portions thereof. The plies 28 and 29 may consist of rubberized cotton tire cord fabric, but preferably consist of a strong, light rayon cord fabric embedded in a thin sheet of rubber with the cords of the two plies crossing at an angle of approximately 45°. In constructing the diaphragm, ply 28 is first laid on and around a shoulder type building drum which has a substantially flat surface with the shoulders having approximately the configuration of the finished edge portion of the diaphragm, all of which is adapted to facilitate placing the diaphragm in its mold. Next, ply 29, somewhat wider than ply 28, is centered upon ply 28 thus providing stepped-off edges between the plies. The inextensible bead portions 30 and 31, in the form of endless annular rings, are placed in the proper position over the edge portions of plies 28 and 29 and the edges of these plies turned up and back over rings 30 and 31 in the fashion of tire building, all of which will be understood by those familiar with the art.

Figure 7:
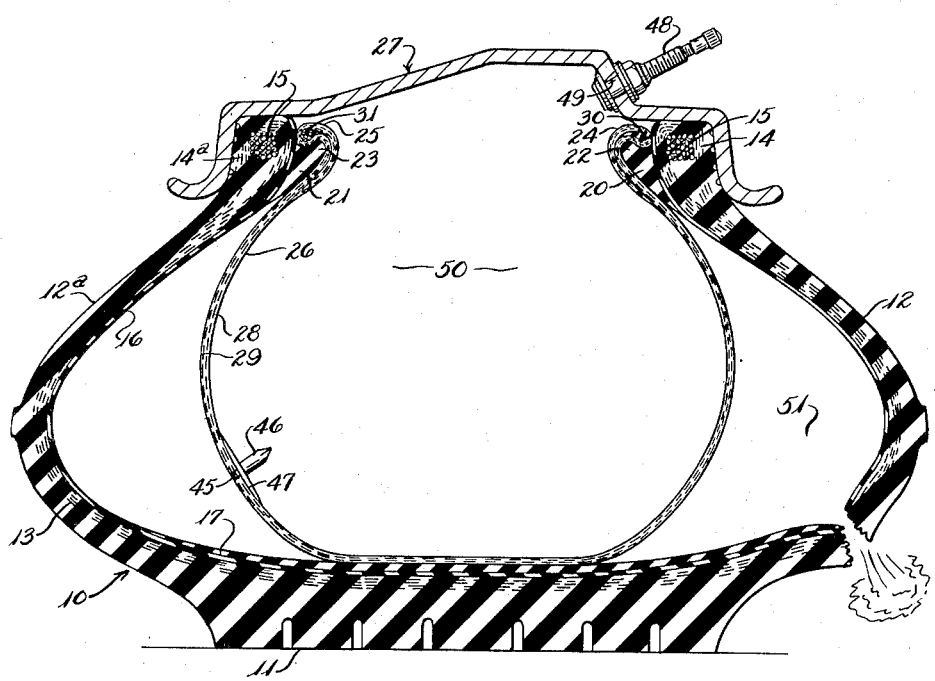
Fig. 7 is a sectional view of the assembly shown in Fig. 1 illustrating the relative positions of the diaphragm and tire body when a tire has blown out and the diaphragm has come into operation as an auxiliary load-carrying member.

The next step is to remove diaphragm 26 from the building drum and place it in a curing mold referred to generally as 40 (see Fig. 3), said curing mold comprising sections 41 and 42 and base members 43 and 44, members 41, 42, 43 and 44 having registering recesses therein, said mold elements together constituting a mold cavity conforming to the shape of the exterior contour of the molded diaphragm 26. In order to pass ring 43 by the inside diameter of section 41 of the mold after the curing bag and diaphragm have been placed in the cavity of sections 41 and 42, ring 43 is formed of three pieces as will be understood by those familiar with tire mold design. In similar fashion, ring 44 is also a three-piece ring provided with a beveled surface portion 44a so that after rings 43 and 44 have been assembled as shown in Fig. 3, a third ring 1 which is endless and has a beveled surface complementary to the beveled surface of the portion 44a is slid into position as shown in Fig. 3. Ring 1 serves to lock ring 44 into operative position against the internal curing pressure of a curing bag 39. Rings 43 and 44 have offset portions 2 and 3 respectively, which overlap so that when ring 44 is locked into position by ring 1 as just explained, said offset portion 3 will lock ring 43 in position through the medium of said offset portion 2. While the design of mold just described has been found satisfactory, obviously other satisfactory designs will occur to those skilled in the art. In vulcanizing and molding the diaphragm 26, the curing bag is inflated in the usual manner with air, steam, water or other fluid pressure medium in the manner of curing pneumatic tires on curing bags. It is to be understood, however, that if found desirable, the mold may be suitably redesigned and the curing bag may be omitted and the diaphragm inflated in mold 40 with said fluid pressure medium in direct contact with the inside surface of the diaphragm in the manner of curing pneumatic tires with the fluid internal molding pressure in direct contact with the inside of the tire. After molding and vulcanization, the diaphragm is removed from its mold and a hole 45 is punched through its wall and a molded rubber valve 46 having a base 47 at attached by connecting or otherwise to the inside surface of the diaphragm, as illustrated in Fig. 1. Valve 46 is of the flutter or check type and is adapted to permit the initial tire inflationary air to pass therethrough. The tire is inflated through an inner tube valve 48 which is in fluid tight contact with the base of the rim 27 and in communication with the inside of said tire through a rim valve hole 49. While valve 46 will permit the passage of initial inflationary air therethrough, into an outer chamber 51, without closing, a sudden rush of air such as would occur in the event of a tire blowout will cause the valve to close and thereby retain any inflationary air within the inner chamber 50 defined by the walls of the diaphragm, rim 27 and the beads of the tire, and thereby convert the diaphragm 26 into an auxiliary load-carrying member as illustrated in Fig. 7.

In mounting the diaphragm 26 in the tire 10, the diaphragm is first inserted within the tire casing in a similar manner as are inner tubes placed in regular tires. After the diaphragm has been so inserted, it will be seen that the inextensible edges 24 and 25 of the diaphragm lie adjacent to but not in the grooves 18a and 19a which form the seats 18 and 19. The inextensible edges 24 and 25 are next placed in grooves 18a and 19a, respectively, by the simple expedient of manually forcing the inextensible members over the rounded circumferential edges 22 and 23 by pressing the latter edges radially outwardly at one portion when said inextensible member will snap into position. After the diaphragm has been mounted, as just described, the tire is mounted on its rim in the usual manner, it being understood that the rim may be a standard rim provided, however, with a valve opening communicating with the opening of the beads of the tire as described above and shown in Fig. 1. Next, the tire is inflated in the usual manner and to the usual pressure. The flow of air into the tire during inflation is relatively slow and the opening in the flutter valve 46 is such that the air will pass therethrough as rapidly as it flows into the diaphragm through regular inner tube valve 48 and for this reason, the valve 48 will not flutter shut during normal tire inflation. When the tire inflation is completed, the air pressure inside and outside the diaphragm will be equal.

It is to be noted, as best shown in Fig. 2, that the inextensible edge portions 24 and 25 of the diaphragm have a contour complementary to the contour of the grooves 18a and 19a, respectively, thereby providing a snug fit between said edges and the surface of said grooves. While some advantages of the invention result without the snug fit, it has been found preferable and is pointed out that the outside diameters of the inextensible edges 24 and 25 are somewhat greater than the inside diameter of the bottom of the grooves 18a and 19a, whereby a tight fit between the edges of the diaphragm and the bottom of said grooves is assured. It will now be seen that the grooves 18a and 19a are molded to predetermined dimensions and due to the use of bull rings 53 and 54, these grooves therein are molded with mechanical accuracy. In like manner, the edges 22 and 23 of the diaphragm are also molded with mechanical accuracy so that when members 18a, 19a and edge portions 24, 25, respectively, cooperate, the diaphragm 26 is caused to occupy an exact predetermined position in the tire relative to the walls thereof. A common practice in the tire manufacturing industry is to provide balanced tires and the present invention contemplates the production of a balanced assembly of said tire proper including the ledges 20 and 21. In like manner, diaphragm 26 is built in balance, it being understood that the diaphragm may be tested for static and dynamic balance and any unbalance may be corrected by the use of patches or other means well known to the art. Accordingly, it will also be seen that with the diaphragm removably anchored in position on ledges 20 and 21, an assembly in static and dynamic balance is provided.

Figure 5:
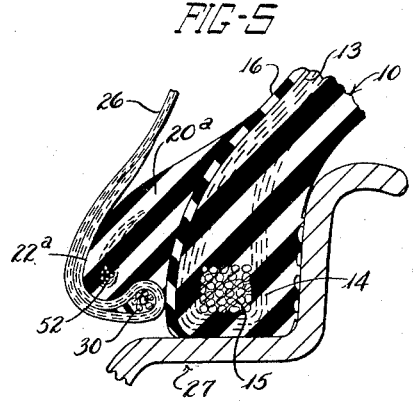
Fig. 5 is a view similar to Fig. 2 but showing a modified form of the wall of the diaphragm seating recess.

A modification of the ledges 20 and 21 is illustrated in ledge 20a shown in Fig. 5 wherein an inextensible ring of wire 52 is disposed in the tip portion of the ledge so as to provide more rigidity to the rounded edge portion 22a. The purpose of the inextensible member 52 is to more firmly interlock the edges of the diaphragm 26 with the ledge 20a. Applicants have found that although the inside diameter of the inextensible member 52 is slightly smaller than the outside diameter of the inextensible member 30 these members may be easily buttoned together in the fashion of mounting tires on drop-center rims or buttoning the lock ring into the marginal gutters of tire rims. Once in operative position as shown in Fig. 5, the diaphragm 26 is more firmly anchored to the bead than in constructions where the inextensible member 52 is omitted. It is to be understood, however, that the use of member 52 is simply a safety factor over that of the construction shown in Fig. 2.

Figure 6:
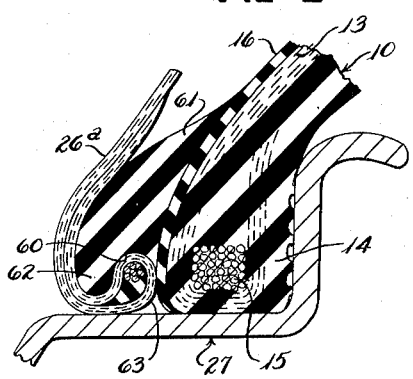
Fig. 6 is similar to Fig. 2 but showing the edges of the diaphragm disposed radially inwardly from the position shown in Fig. 2.

Another modification of the invention is illustrated in Fig. 6 and it will be seen that the construction there illustrated is the same as that shown in Fig. 2 except the groove 60 and rounded edge portion 62 in the ledge 61 are disposed radially inwardly of the ledge a distance which permits clearance between the rounded edge 62 and the tire base that approximately equals the thickness of the diaphragm at that point, but such clearance is less than the thickness of the edge 63 of the diaphragm 26a. Since the edge portion 63 is disposed in the groove 60 before the tire beads are placed on their bead seat, it will be seen that the mounting of the construction shown in Fig. 6 will offer no difficulty, but once in operative position, the edge portion 63 is securely locked within the groove 60. If found desirable, a reinforcement of the ledge 61 similar to that shown in Fig. 5 may be used. While the construction shown in Fig. 1 is entirely satisfactory for passager car use or where the service is not extremely severe, it is to be noted that where the tire is to be subjected to unusual service, as for example by the military, such constructions as shown in Figs. 5 and 6 are desirable.

The detailed description of the particular embodiments of the invention illustrated herein is not to be construed as limiting the invention thereto. The invention includes all features of patentable novelty residing in the foregoing description and the accompanying drawings.

What is claimed is:

1. In combination a tire casing of the tubeless tire type having beads therein, a diaphragm disposed within said casing, and a tire rim receiving said casing and diaphragm, said diaphragm being of the general shape of an open-beaded type tire and having continuous circumferentially extending inextensible radially inward edge portions and having a crown portion, said crown portion being retained out of contact with the crown area of said casing, said casing having circumferentially extending diaphragm-edge-receiving seats in the form of radially inwardly opening grooves formed in ledges that extend laterally inwardly from the bead portions of said tires, said ledges being fixedly attached to said casing, the bottom of said grooves having a diameter at least as small as the outside diameter of the edges of said diaphragm, said edges of the diaphragm being seated on the bottom of said grooves.

2. In combination a tire rim and a pneumatic tire of the open-beaded type, said tire having bead portions and an air impervious lining extending from toe to toe of said bead portions; a removable diaphragm mounted within said casing and dividing the casing into inner and outer concentric annular air chambers, said diaphragm comprising a reinforced rubber body molded to the general shape of an open-beaded tire and terminating radially inwardly in continuous inextensible edge portions, the bead portions of said tire having laterally inwardly projecting shoulders, said shoulders having radially inwardly opening grooves molded in their radially inward faces, said diaphragm edge portions being removably seated in said grooves.

3. In combination a tire casing having beads therein, a diaphragm disposed within said casing, and a standard tire rim on which said casing and diaphragm are mounted, said diaphragm being in the general shape of an open-beaded tire and having continuous inextensible circumferentially extending bead portions at its radial inner edges and having a crown portion, said crown portion normally being retained out of contact with said casing, said casing having circumferentially extending diaphragm-edge-receiving seats in the form of radially inwardly opening grooves formed in ledges projecting laterally inwardly from the lateral inner area of said beads, said ledges being an integral part of said casing and said diaphragm edge portions being seated in said grooves on said seats.

4. A tubeless pneumatic tire of the open-beaded type having bead portions, characterized by continuous circumferentially extending shoulders projecting laterally inwardly from and integral with the lateral inner area of the tire bead portions, a diaphragm of the general shape of an open-beaded tire mounted in said tire, said diaphragm having two inextensible annular coaxial edge portions of the same diameter flared laterally and radially outwardly, seats for said inextensible diaphragm edges, said seats comprising a continuous radially inwardly facing groove formed in each of said shoulders, the bottom portion of said grooves having a diameter not larger than the greatest outside diameter of said flared portion of said diaphragm.

5. In combination a pneumatic tire casing of the open-beaded tubeless tire type having crown and bead portions, a diaphragm disposed within said casing, and a tire rim receiving said casing and diaphragm, said diaphragm being of the general shape of an open-beaded tire and having continuous circumferentially extending inextensible radial inward annular edge portions having an outside diameter and a crown portion, said diaphragm crown portion normally being retained out of contact with the crown portion of said casing; a laterally inwardly extending shoulder having lateral and radial inward edge portions formed on and integral with each bead portion of the tire, each said shoulder having a continuous radially inwardly opening groove formed in the radial inward surface thereof, said diaphragm having continuous annular coaxial inextensible edge portions of the same diameter, the edge portions of the diaphragm being flared laterally and radially outwardly, said inextensible edge portions of said diaphragm being seated in said grooves, a ring of inextensible material embedded in each of said shoulders at the lateral and radial inner edge portion thereof, the inside diameter of said embedded rings being smaller than the outside diameter of the diaphragm edges, whereby the edges of the diaphragm may be firmly but removably locked to said tire in said grooves.

6. In a tire having a crown and bead portion, diaphragm and rim assembly of the character described, said tire having annular shoulders extending laterally inwardly from said bead portions and overlying a portion of said rim, each said shoulder having a radially inward surface spaced radially outwardly from the rim portion the shoulder overlies, said shoulders having diaphragm-edge-receiving seats formed in said radial inward surfaces of said shoulders, said seats being in the form of continuous radially inwardly opening grooves, said diaphragm being in the general shape of an opened-beaded tire and having a crown portion and continuous annular inextensible circumferentially extending bead portions at the diaphragm's radial inner edges; the radial inner edge portion of the diaphragm being turned laterally and radially outward and said inextensible edges of the diaphragm beads being removably seated in said grooves, the outside diameter of the diaphragm beads relative to the diameter of the bottom of said grooves being such as to provide an air tight contact therebetween.

7. In a tire, diaphragm and rim assembly of the character described, said tire having annular shoulders extending laterally inwardly from the bead portions of said tire, each said shoulder having a radially inward surface spaced radially outwardly from the rim portion the shoulder overlies, said shoulders having diaphragm-edge-receiving seats formed in said radial inward surfaces of said shoulders, said seats being in the form of continuous radially inwardly opening grooves, said diaphragm being in the general shape of an opened-beaded tire and having a crown portion and annular continuous inextensible circumferentially extending bead portions at the diaphragm's radial inner edges; the radial inner edge portion of the diaphragm being turned laterally and radially outward and said inextensible edges of the diaphragm beads being removably seated in said grooves, the outside diameter of the diaphragm beads relative to the diameter of the bottom of said grooves being such as to provide an air tight contact therebetween; a ring of inextensible material embedded in each of said shoulders laterally inwardly of said grooves, the inside diameter of said rings being no greater than the outside diameter of the inextensible edge portions of the diaphragm.

8. In a tire, diaphragm and rim assembly of the character described, said tire having annular shoulders extending laterally inwardly from the bead portions of said tire, each said shoulder having a radially inward surface spaced radially outwardly from the rim portion in overlying relation therewith, said shoulders having diaphragm-edge-receiving seats formed in said radial inward surfaces of said shoulders, said seats being in the form of annular continuous radially inwardly opening grooves the lateral inner portions of said shoulder terminated in rounded edges, said diaphragm being in the general shape of an opened-beaded tire having a crown portion and continuous inextensible circumferentially extending bead portions at the diaphragm's radial inner edges; the radial inner edge portion of the diaphragm being turned laterally and radially outward and said inextensible edges of the diaphragm beads being removably seated in said grooves, the outside diameter of the diaphragm beads relative to the diameter of the bottom of said grooves being such as to provide a continuous contact therebetween; a ring of inextensible material embedded in each of said rounded edges of said shoulders laterally inwardly of said grooves, the inside diameter of said rings being less than the outside diameter of the inextensible edge portions of the diaphragm; the space between the radial inner surface of said shoulders laterally inward of said grooves and said rim being less than the thickness of said edges of the diaphragm whereby in said assembly said rings and rim lock said inextensible diaphragm edges in said grooves.

References Cited in the file of this patent

UNITED STATES PATENTS 2,674,292     Sutton     Apr. 6, 1954

FOREIGN PATENTS 1,048,898     France     Aug. 12, 1953
(Corresponding U. S. Patent 2,713,371, July 19, 1955)